(12) United States Patent
Satterfield et al.

(10) Patent No.: US 8,261,930 B2
(45) Date of Patent: Sep. 11, 2012

(54) PORTABLE TANK

(75) Inventors: Joby Satterfield, Boaz, AL (US); John Lackey, Boaz, AL (US)

(73) Assignee: Pinnacle Manufacturing, LLC, Boaz, AL (US)

( * ) Notice: Subject to any disclaimer, the term of this patent is extended or adjusted under 35 U.S.C. 154(b) by 1070 days.

(21) Appl. No.: 12/187,990

(22) Filed: Aug. 7, 2008

(65) Prior Publication Data

US 2010/0032435 A1    Feb. 11, 2010

(51) Int. Cl.
*B60P 3/22* (2006.01)
*B62D 25/20* (2006.01)
*B60P 3/24* (2006.01)

(52) U.S. Cl. .................. 220/562; 280/837; 280/839

(58) Field of Classification Search ................ 220/562, 220/563, 564; 280/837, 839
See application file for complete search history.

(56) References Cited

U.S. PATENT DOCUMENTS

| | | | |
|---|---|---|---|
| 2,135,573 A | | 11/1938 | Gill |
| D253,051 S | | 10/1979 | Pletcher |
| 4,318,549 A | | 3/1982 | Pletcher |
| 4,406,471 A | | 9/1983 | Holloway |
| 4,648,775 A | * | 3/1987 | Verner ................... 414/513 |
| D298,273 S | | 10/1988 | Cobb |
| 4,819,955 A | | 4/1989 | Cobb |
| D301,326 S | | 5/1989 | Adams |
| 4,874,184 A | | 10/1989 | Boyer |
| 5,004,269 A | * | 4/1991 | Pelt ..................... 280/837 |
| D318,033 S | | 7/1991 | Pelt |
| 5,058,924 A | | 10/1991 | Whatley, Jr. |
| 5,213,367 A | | 5/1993 | Norman, Jr. et al. |
| D348,304 S | | 6/1994 | Norman, Jr. et al. |
| D353,352 S | | 12/1994 | Holloway, Jr. |
| D375,470 S | | 11/1996 | Adams |
| D379,948 S | | 6/1997 | Wade |
| 5,653,469 A | | 8/1997 | Wade |
| 5,671,855 A | | 9/1997 | Norman, Jr. et al. |
| D384,913 S | | 10/1997 | Norman, Jr. et al. |
| 5,957,500 A | * | 9/1999 | Wade ................. 280/837 |
| D417,171 S | | 11/1999 | Satterfield et al. |
| 6,152,492 A | | 11/2000 | Markham et al. |
| 6,173,991 B1 | | 1/2001 | Piona et al. |
| 6,199,910 B1 | | 3/2001 | Wade |
| D441,692 S | | 5/2001 | Niblett et al. |
| D442,520 S | | 5/2001 | Wade |
| 6,279,955 B1 | | 8/2001 | Fisher |
| 6,375,222 B1 | | 4/2002 | Wade |
| 6,390,325 B1 | | 5/2002 | Gonzales |
| D557,178 S | | 12/2007 | Petzitillo, Jr. et al. |
| 2006/0012219 A1 | * | 1/2006 | Ingram et al. ............ 296/168 |

* cited by examiner

*Primary Examiner* — Mickey Yu
*Assistant Examiner* — Niki Eloshway
(74) *Attorney, Agent, or Firm* — Mark Swanson; Bradley Arant Boult Cummings (57) ABSTRACT

A portable tank includes a tank interior defined by a plurality of panels, with the floor panel supported by a floor support structure. The floor support structure includes side channels with cross members connecting the side channels. A mid floor beam is received in notches formed in some of the cross members, and a rear floor beam is received in notches formed in different cross members. The mid floor beam and the rear floor beam do not span the entire length of the tank. There are cross members with smooth sided upper support surfaces in front of and behind the mid floor beam, and cross members with smooth sided upper support surfaces in front of the rear floor beam.

21 Claims, 8 Drawing Sheets

PORTABLE TANK

BACKGROUND OF THE INVENTION a. Field of the Invention

The current invention relates to portable storage tanks.

b. Background of the Invention

Large tanks are currently provided for storing and dispensing fluids such as fracturing liquids, drilling muds and the like for use at a gas or oil well site. Such tanks are also used to receive and hold fluids and chemicals at industrial plants. They are also used on environmental clean-up jobs as well as spills to hold fluids until they can be properly disposed of. When empty, these tanks are towed by truck from one site to another where they are refilled and reused.

When an oil well is brought into production, it will generally produce salt water as well as oil and natural gas. It is common practice to separate the gas from the liquids, and to separate the oil from the salt water. The oil and saltwater are stored in separate tanks of a tank battery placed at the oil well site. The oil is sold from tanks within the tank battery and the salt water is temporarily stored so that it can be subsequently disposed of without harming the environment.

One type of tank which has been used to store oil and salt water has been constructed in the form of a cylinder. This shape exploits the rigidity of a cylindrical structure against hydro-static pressure by liquids within the tank. With this shape, the volume of the oil in the tank is proportional to the depth of the oil in the tank. Because of this proportionality, the oil buyer can determine the quantity of oil he has purchased by measuring the change in depth in the tank and applying an appropriate conversion factor. However, construction of cylindrical tanks involves the bending of plate metal into curved sections.

For transportation purposes, the width of a cylindrical tank is its diameter, and the diameter is fixed by the height and volume of the tank. As a result, cylindrical tanks will often present a wide load to be transported. Similarly, cylindrical tanks cannot be packed together into a compact load because of the curvature of their surfaces. As a result, portable cylindrical tanks have been transported to oil fields as individual units, which are then individually placed and connected with other tanks and to the well prior to use. The inter-connection of the tanks can involve cutting pipe to length and threading the ends of the pipe for screw connections.

Sometimes a well will not produce oil in sufficient quantity for the continuation of production from the well in a commercial fashion. When this occurs, not only is the initial cost of transporting the tank battery to the well and placing the tank battery for production lost, but additional cost is incurred in dismantling the tank battery and transporting the tanks from the site of the well to a new location.

Portable rectangular tanks have also been developed and used in the oil industry. These tanks usually have lengths of 30 to 40 feet, a height of from approximately 9 to 12 feet and a width of 8 feet. These tanks are usually transported as trailers behind trucks. Various state and local highway ordinances limit the size of these trailers for over-the-road transport, but these tanks can be made such that special oversize load permits are not needed for transportation. Placing the rectangular tanks side by side allows for more standard pipe distances when a tank battery is set up. Rectangular tanks can be set up side by side, with little space between tanks, so space is efficiently used within a tank battery.

Frequently, these tanks will be rented, where the user pays rent for each tank in use. If larger tanks were provided, the user would be able to rent fewer tanks for a possible cost savings. Also, certain operational and maintenance tasks are required for each tank, so having fewer overall tanks would reduce these operational and maintenance tasks. These tanks are constructed to hold a large capacity, but Department of Transportation (DOT) requirements, manufacturing factors, customs, and other factors tend to limit the maximum tank volume.

SUMMARY OF THE INVENTION

The current invention is a portable storage tank having an axle permanently attached to the tank. A king pin is included for towing the tank from one location to another. The tank is designed to meet DOT's requirements for highway transport while maximizing tank volume. The materials used during the construction of the tank are minimized to reduce the weight of the tank as well as reducing the cost of materials used in the tank construction.

A plurality of panels enclose a tank interior and a floor support structure provides strength to support the tank. Cross members are supported at their ends by side channels, and the grid formed by the cross members and side channels forms a portion of the floor support structure. Floor beams are positioned in notches in a plurality of cross-members to provide additional supports. Floor beams are positioned near the middle of the tank and also at the rear of the floor support structure, but the floor beams do not extend the length of the tank. The floor beams used are rectangular tubes to increase their strength, and the floor beams and cross members support a floor panel. Positioning the floor beams in the cross member notches reduces the volume of the floor support structure, which increases the potential volume of the portable tank.

DETAILED DESCRIPTION

DOT Requirements

The Department of Transportation (DOT) has several requirements for transporting a load on the roads and interstates of the United States. There are requirements that limit the weight of a load, the number of axles, and the overall dimensions, such as the width and height of the load. These requirements are provided to maintain security and safety on the roads. The weight limits and axel limits prevent road damage from excessively heavy loads. The roads are built to accommodate vehicles of certain sizes, so size limits are needed to prevent traffic disruptions from vehicles larger than specified standard dimensions.

If a load does not meet certain of the DOT requirements, it is still possible to transport, the load with a special permit. These special permits impose many restrictions on the load transporter, such as the load has to be transported only during the days of the week and not on the weekends. Also, the load has to be transported only in day light hours, and not at night. In addition, the load may have to take special routes to avoid low bridges or narrow roads, and often times oversized loads will require signal vehicles to travel either in front of and/or behind the oversized load to warn other traffic of the potential hazard. A load that fails within DOT requirements does not need an oversize load permit, and the additional requirements imposed on oversized loads are not applicable.

Some of the DOT requirements include a width of no more than 102 inches and a height of no more than 156 inches. The height is for the load as it is transported, so that means this height applies to the load when it is connected to a transport vehicle, such as a semi-tractor. The length of a trailer cannot exceed 636 inches The maximum gross vehicular weight (GVW) cannot exceed 80,000 lbs, and the maximum weight per axel is 20,000 lbs. DOT also has other requirements, such as special lighting and placarding for loads, as well as certain recordkeeping requirements for the transportation of many materials. This discussion is directed primarily towards the physical dimension requirements of a load. On embodiment of the invention also includes the necessary lighting, placarding, and other requirements specified by the DOT.

Oil Field Needs

One embodiment of the invention is a portable tank which is frequently used with drilling rigs for oil exploration purposes. Often times these tanks are called frac tanks, which refers to fracturing tanks. These tanks are used for temporary fluid storage at a drill site, and then are transported when drilling ends and the tanks are no longer needed. Portable tanks are also used for a wide variety of other purposes, such as environmental clean ups and certain oil field pumping needs.

In use, the tank should be quick and easy to set up, and also quick and easy to take down in preparation for a move. The tank should have access to the roof for inspections and maintenance, and there should be convenient pipes and valves to connect the tank to other tanks and to process equipment. The tank needs to be strong enough to withstand the rigors of industrial use, including the special stresses imposed by over the road transportation. Ease of cleaning should be considered, and robust and easy connections for transporting the tank are desirable. Typically, the tank is transported as a fifth wheel behind a semi tractor. Low costs of production are also desirable, as well as long life to minimize tanks needing to be replaced.

Tank Design

One embodiment of the invention describes a roughly rectangular tank which can be connected to a semi-tractor for transportation. The tank has wheels attached so that it can roll over the road and it can be dropped and placed at a drill site for use as necessary. The tank is typically transported when empty to minimize weight and to reduce stress on the tank.

A. Enclosed Tank Interior

Figure 1:
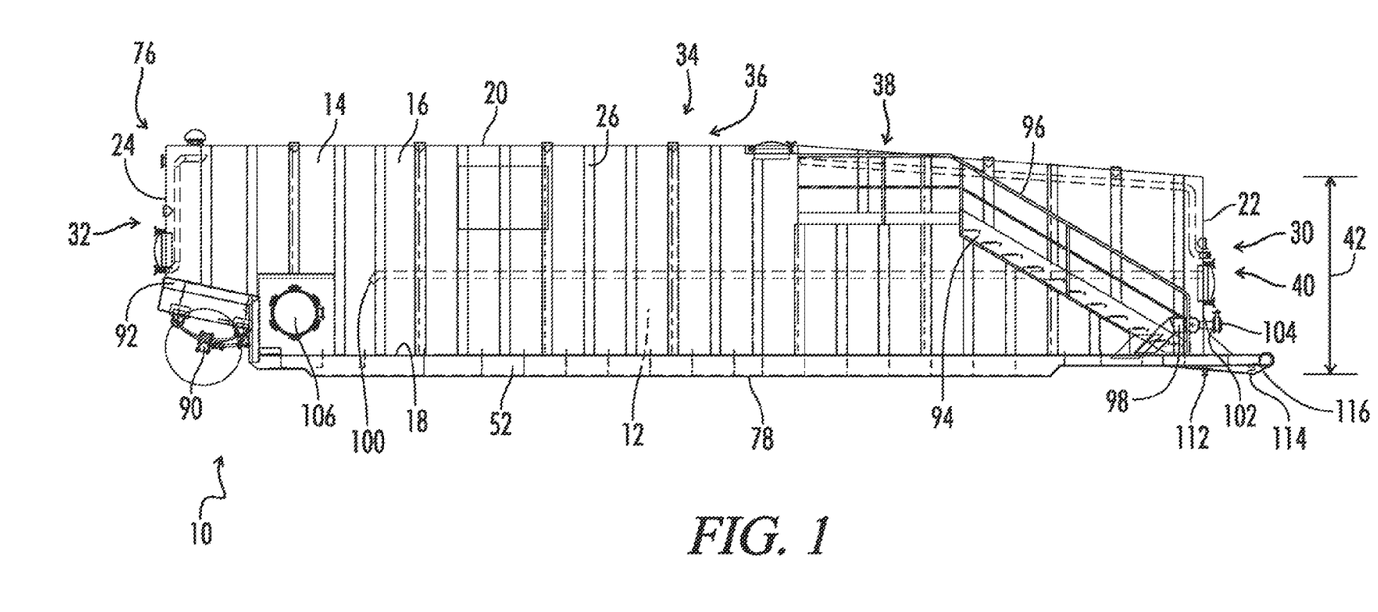
FIG. 1 is a side view of the portable tank.
Figure 2:
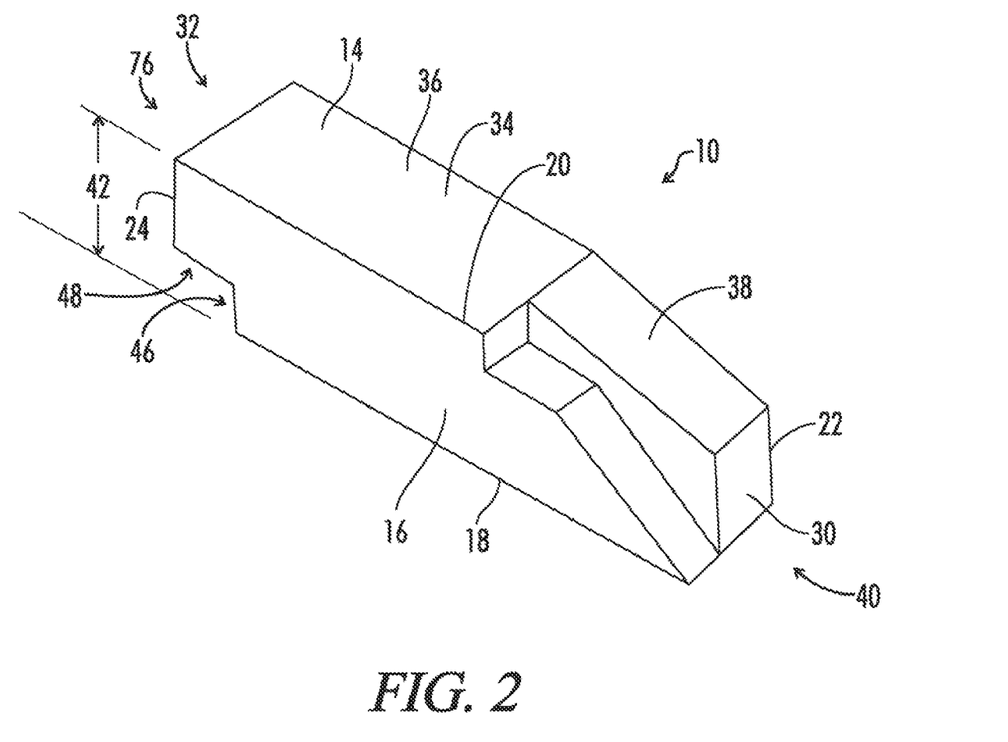
FIG. 2 is a perspective view of the panels defining the tank interior.

Referring to FIGS. 1 and 2, one embodiment of the portable tank 10 has an enclosed interior 12 which is defined by a plurality of panels 14, which can be made of plate metal. The panels include two side panels 16 which are essentially parallel. Opposing panels 14 are generally parallel to maximize the volume of the tank 10, but opposing panels 14 don't need to be perfectly parallel. The side panels 16 have a bottom edge 18, a top edge 20, a front edge 22, and a rear edge 24. The side panels 16 are not necessarily regular rectangles but can include various notches or angles for such things as wheels, stairwells, sloped roofs, etc.

Support channels 26 can be attached to the side panel 16 to strengthen and stiffen the side panels 16. The support channels 26 are typically "C" shaped channels attached to the side panel 16, with the "C" facing in towards the side panel 16. Rectangular tubes or other structures could also be used. The support channels 26 can be welded to the side panel 16 such that the support channels 26 are vertical. Support channels 26 are also welded or connected to the floor support system which will be described later. The support channels 26 can be welded to the outer surface of the side panel 16, which leaves the inner surface of the side panel 16 flat and easier to clean.

The plurality of panels 14 also includes a front panel 30 and a rear panel 32, where the front and rear panels 30, 32 are essentially parallel. The front and rear panels 30, 32 can also include support channels 26, which can be vertical, horizontal, or even set at an angle. The support channels 26 are typically attached to the front and rear panel 30, 32 by welding, but bolts or other methods could be used. The front and rear panel 30, 32 are typically shorter in length than the side panel 16 so the need for the support channels 26 is not as great as with the side panels 16. The expanse of the side panel 16 produces a larger span which needs to be stronger to support the weight of the material within the tank interior 12. The front panel is connected to the front edge 22 of each side panel 16 and the rear panel 32 is connected to the rear edge 24 of each side panel 16. Therefore, the front, rear and side panels 30, 32, 16 produce an essentially rectangular shape which defines the sides of the tank interior 12.

Figure 3:
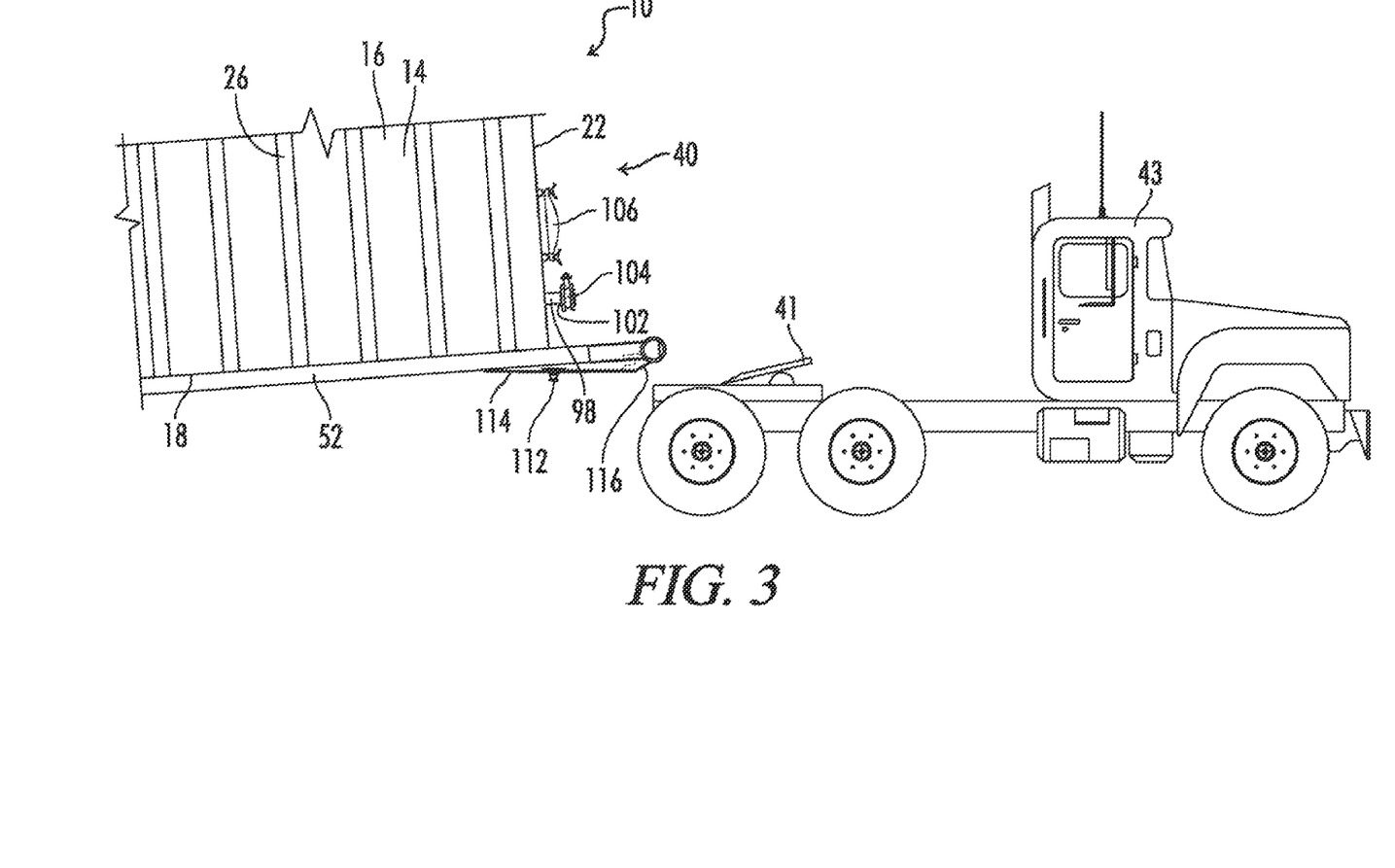
FIG. 3 is a side view of the front of the tank being loaded onto a semi tractor.

The panels 14 also include a roof panel 34 connected to the top edge 20 of the side panels 16. The roof panel 34 is also connected to the front and rear panel 30, 32. The roof panel 34 can also include angles and notches for various aspects of the tank 10. One embodiment of the roof panel 34 includes a horizontal section 36 positioned behind a sloped section 38. FIG. 3 shows the portable tank 10 being lifted at a tank front end 40 and connected to the fifth wheel 41 of a semi-tractor 43, with continuing references to FIGS. 1 and 2. Other modes of transporting the tank 10 are also acceptable, such as rail, ship, or barge transport. Because of this, in transit the tank front end 40 is higher than when the tank is sitting on the ground at a job site. The sloped section 38 of the roof panel 34 provides for a lower overall tank height 42 when the tank 10 is mounted on a semi-tractor 43. The horizontal rear section 36 of the roof panel 34 is not necessarily sloped because this section is not lifted as much when the tank 10 is mounted on a semi-tractor 43. Therefore, sloping the front section of the roof panel 34 but having the rear section of the roof panel 34 horizontal maximizes the tank volume while still complying with DOT height requirements.

Figure 4:
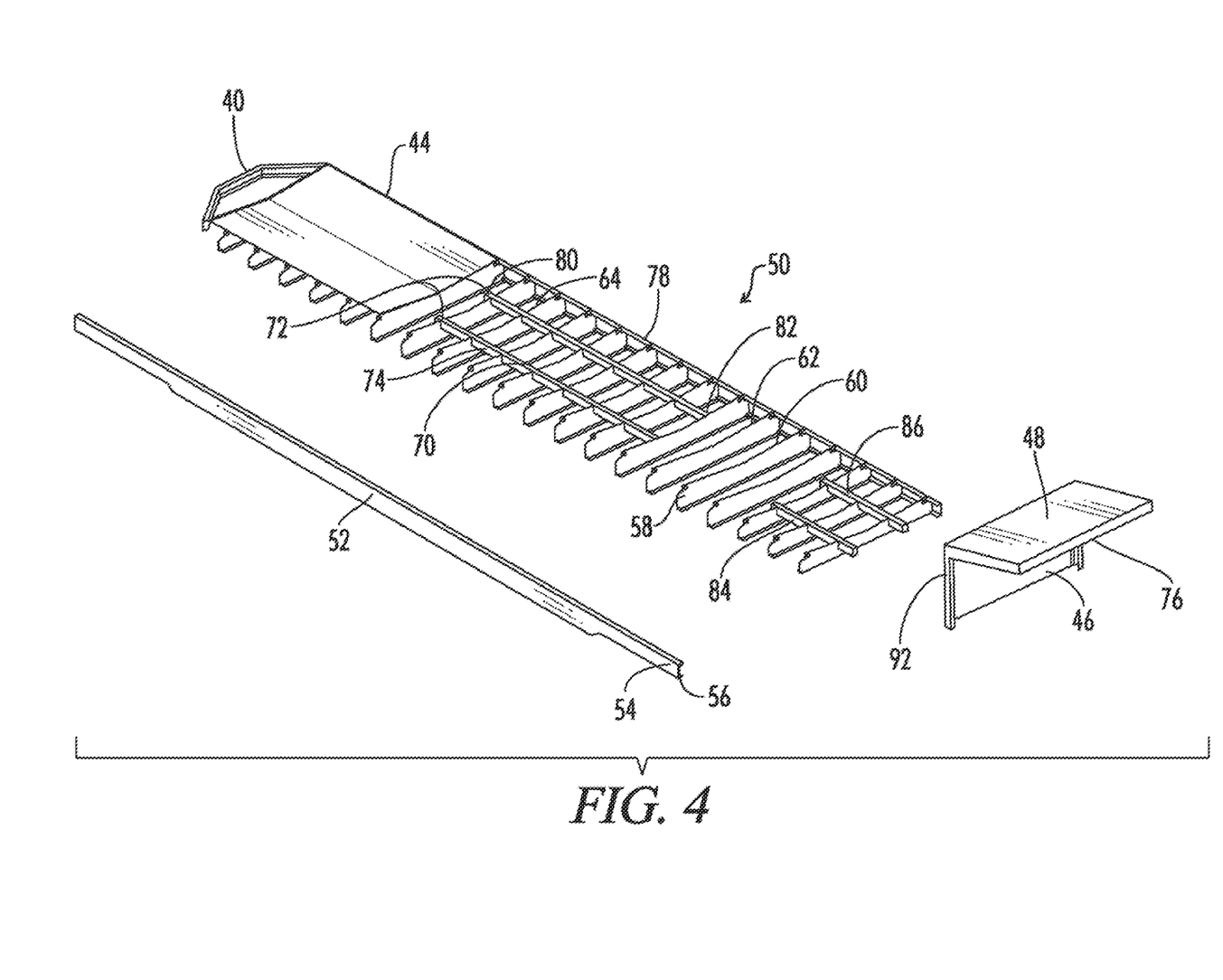
FIG. 4 is a partially exploded perspective view of the floor support structure and the axel support structure.

The panels 14 also include a floor panel 44 which is connected to the side panels 16 near the side panel bottom edges 18, as seen in FIG. 4, with continuing reference to FIGS. 1, 2, and 3. The floor panel 44 is also connected to the front and rear panels 30, 32. The floor panel 44 can have somewhat of a V-shape to improve drainage such that liquids will tend to flow to the lower-most portion of the "V" in the floor panel 44. The floor panel 44 can also include a raised section for the rear axle. This raise section in the floor panel 44 has at least one section which is more or less vertical, or the vertical floor section 46, which is followed by the more or less horizontal axel floor panel section 48.

The six panels 14 mentioned, the two side panels 16, the front and rear panels 30, 32 and the roof and floor panels 34, 44 comprise the basic containment that defines the portable tank interior 12. There are many possible permutations or variations within the shapes of these panels 14 which remain within the scope and intention of the current invention. There can be bends, angles, notches, curves, and other variations in the shape of the panels 14, as long as the panels 14 define an enclosed tank interior 12.

B. Floor Support Structure

Figure 5:
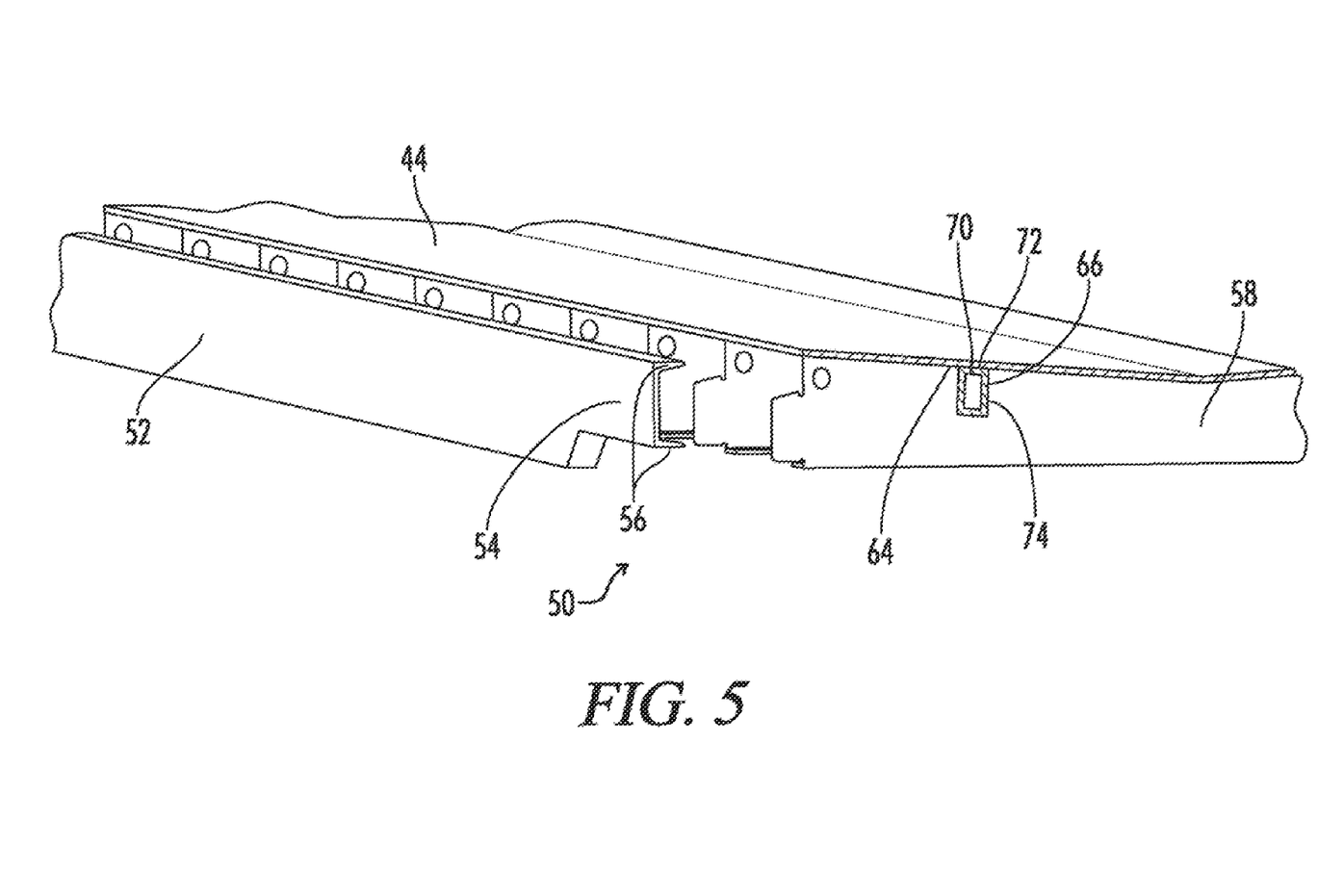
FIG. 5 is a partially exploded perspective cross section of the floor support structure.

The floor panel 44 is generally under the liquid in the tank 10, additional strength is provided by some sort of support structure, as seen in FIGS. 4 and 5, with further reference to FIG. 1. A floor support structure 50 is made up of a grid of different supports elements, and the floor support structure 50 is positioned under the floor panel 44. Two inward facing side channels 52 run the length of the tank 10 and form the exterior or side of the floor support structure 50. The side panels 16 are connected to the side channels 52, as well as the support channels 26. The side panels 16 provide additional strength, stiffness and support for the floor support structure 50.

Figure 6:
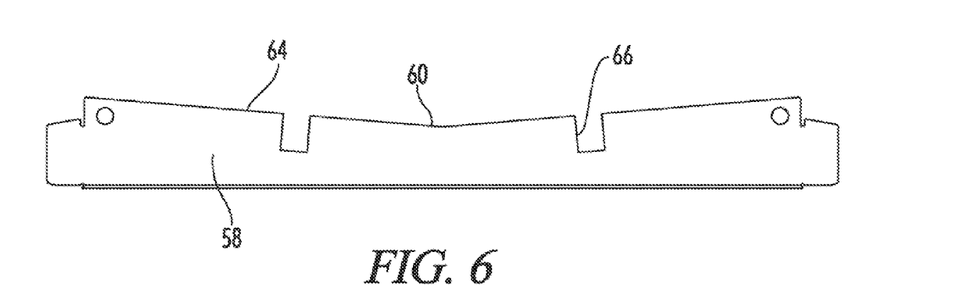
FIG. 6 is a front view of a cross member.
Figure 7:
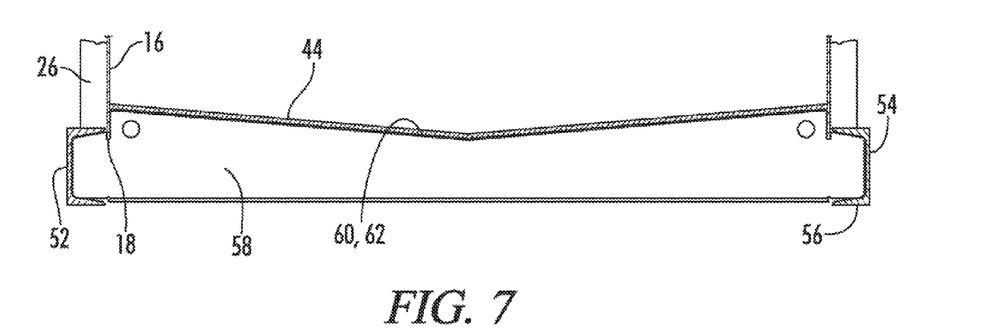
FIG. 7 is a partial front cross section view of a cross member with a smooth upper supporting surface installed in the tank.
Figure 8:
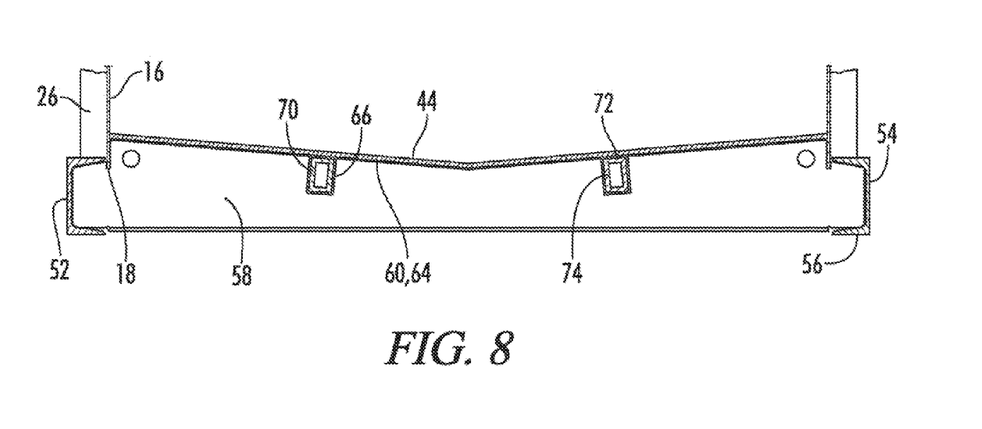
FIG. 8 is a partial front cross section view of cross member with a notched upper supporting surface installed in the tank.

Referring now to FIGS. 6, 7, and 8, with further reference to FIG. 5, the side channels 52 are typically made of a C-shaped beam which has a vertical section 54 capped with a top and bottom horizontal section 56 where the top and bottom horizontal sections 56 only extend from one side of the vertical section 54. A plurality of cross-members 58 extend between the side channels 52 wherein each cross-member 58 is connected on opposite sides to opposing side channels 52. In one embodiment, the cross-members 58 are essentially perpendicular to the side channels 52 and the side channels 52 and cross-members 58 form the basic grid or at least a portion of the basic grid which makes the floor support structure 50.

There are a plurality of the cross-members 58 which are spaced to span the length of the floor support structure 50. The spacing of the cross-members 58 can vary depending on the tank design parameters. The cross members 58 can be unitary, which means the cross members 58 are a single piece spanning between the opposing side channels 52. The unitary cross member 58 simplifies the tank support structure 50 building processes, because there are fewer parts and fewer connections to made than if the cross member 58 were made of more than one piece. This reduces labor costs during tank 10 construction. Also, unitary cross members 58 provide a more consistent part than a welded or assembled piece, which can provide tighter tolerances in the tank 10. In one embodiment, the cross-members have a v-shaped upper surface 60 which is used to support the floor panel 44, so the floor panel 44 rests directly on the cross-member tipper surface 60. The cross-member upper surface 60 is V-shaped to match the liquid draining V-shape of the floor panel 44.

The cross-members 58 have two basic designs for the upper surface 60. The first basic design is the smooth upper supporting surface 62, as shown in FIG. 7, and the second basic design is the notched upper supporting surface 64, as shown in FIG. 8. Referring to FIGS. 4 through 8, the smooth upper supporting surface 62 is not necessarily entirely flat, especially considering the upper surface 60 can be generally V-shaped. However, the smooth upper surface 62 does not include significant angles over about 30 degrees anywhere where the upper surface 60 contacts the floor panel 44. The notched upper supporting surface 64, however, does include angles of greater than about 30 degrees, and this is because the notches 66 are formed in the upper surface 60.

Other components of the floor support structure 50 include the mid-floor beams 70. The mid-floor beams 70 are received or positioned within the cross-member notches 66 such that a mid-floor beam support surface 72 is flushed with the cross-member notched upper supporting surface 64. This allows the floor panel 44 to rest directly on the mid-floor beam support surface 72 and the cross member upper support surface 60 at the same time, so the floor panel 44 is therefore simultaneously supported by both the cross-member upper surface 60 and the mid-floor beam support surface 72. The mid-floor beams 70 can be positioned essentially parallel with the side channels 52 so the mid-floor beams 70 are also essentially perpendicular to the cross-members 58.

The mid-floor beams 70 can have a rectangular tubular shape such that there are four sides 74 of the mid-floor beam 70. The four sides 74 of the mid-floor beam define an internal space within the mid-floor beam 70, but it is also possible for the mid-floor beam to be solid. The mid-floor beam tubular shape is generally a rectangle, although other shapes such as squares or even circles are possible. The tubular construction of the mid-floor beams 70 provides additional strength for the mid-floor beams 70. This is because the mid-floor beams support surface 72 is supported on both sides by mid-floor beam sides 74, and a bottom mid-floor beam side 74 completes the tubular structure to provide additional strength to the mid-floor beams 70.

Typically, the mid-floor beam 70 is set in the cross-member notches 66 such that the short side of the rectangle of the mid-floor beam 70 forms the mid-floor beam support surface 72 and the long side of the rectangle 74 is supporting the mid-floor beam support surface 72. Therefore, the long sides 74 of the rectangle are pointing more or less up and down instead of side to side. The use of these long sides 74 pointing more up and down provides additional strength for the mid-floor beams 70 to support the weight inside the portable tank 10. This orientation results in a shorter span of the mid floor beam support surface 72 between the wider and therefore stronger mid floor beam sides 74 from the long side of the rectangle. The mid floor beams 70 provide additional rigidity to the tank 10, which is most significant during transport.

The raid-floor beam 70 is placed within notches 66 of the cross-members 58 to maximize the potential volume of the tank interior 12. If the mid-floor beam 70 were placed on top of the cross-members 58, it would force the floor panel 44 to be higher which would reduce the tank interior volume 12. Also, if the mid-floor beams 70 were placed underneath the cross-members 58, this would again result in a reduced interior volume 12. If the mid-floor beam 70 were placed underneath the cross-members 58, the floor support structure 50 would be thicker, which would force the floor panel 44 to be higher, which reduces the volume of the tank interior 12. Therefore, by positioning the mid-floor beams 70 within cross-member notches 66, the volume of the tank interior 12 can be maximized because the thickness of the floor support structure 50 is minimized. The cross-member notches 66 are sized to receive the mid-floor beams 70 so there is very little wasted space between the cross members 58 and the mid-floor beam 70.

Near the middle of the floor panel 44, there are at least two primary supports running lengthwise with the tank 10; the mid floor beams 70 and the side channels 50. The side channels 52 support the sides of the floor panel 44 where the floor panel 44 connects to the side panel 16, and the mid floor beams 70 roughly divide the width of the floor panel 44 into equal sections. This means the distance between the mid-floor beams 70 and side channels 52 is approximately equal to the distance between adjacent mid-floor beams 70. Preferably, the tank 10 includes two mid-floor beams 70, but the tank can include more or even fewer mid floor beams 70. The roughly even spacing results in a shorter span of the floor panel 44 between supporting side channels 52 and mid floor beams 70.

When a portable tank 12 is transported, the tank front end 40 is lifted to put the tank 12 on a semi-tractor 43, referring now to FIGS. 1, 3, 4, and 6 through 9A and 9B. The portable tank 10 is then driven over the road where there are various bumps and stresses placed on the tank 10. During transit, the tank 10 is supported at the back by the axel and wheels, and at the front by the fifth wheel 41 of the semi-tractor 43. The areas of maximum stress on the portable tank 10 are in the middle of the span between the rear axel and the support point on the semi-tractor, and also near the rear axel. The center portion of the tank 10, which is approximately equal distance between the tank front end 40 and a tank rear end 76, has the greatest need for additional support. Furthermore, due to the bouncing and bumping at the tank rear end 76, additional support is frequently needed in this area as well. For this reason the floor panel 44 and floor support structure 50 receive extra support at these areas of high stress.

Figure 9A:
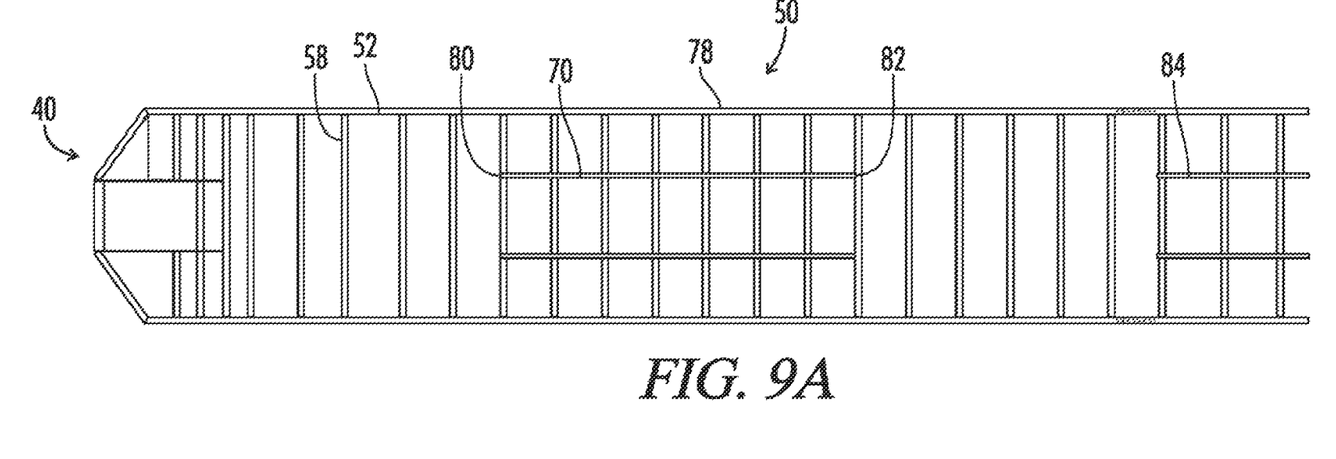
FIG. 9A is a top view of the floor support structure.
Figure 9B:
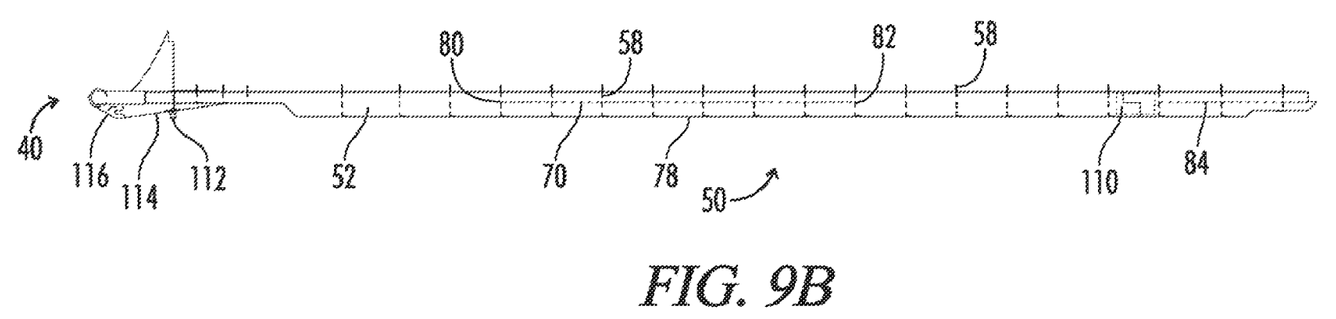
FIG. 9B is a side view of the floor support structure.

The mid-floor beams 70 span the mid-point 78 of the floor support structure 50. The floor support structure mid-point 78 is the mid-point 78 relative to the length of the floor support structure 50. These mid-floor beams 70 do not run the entire length of the floor support structure 50. By minimizing the length of the mid-floor beams 70, the total weight of the portable tank 10 is minimized and the amount of materials used in the tank construction is also minimized. Saving weight allows for a lighter structure, and saving materials allows for less expense in the construction of a tank 10. The lighter structure reduces the amount of weight that must be supported when the tank 10 is transported, so the lighter structure reduces the maximum stresses on the tank 10. This facilitates reducing the thickness of the floor support structure 50, which helps to maximize the tank volume.

Because the mid-floor beams 70 do not run the length of the floor support structure 50, there are cross-members 58 with smooth upper supporting surfaces 62 on both sides of the mid-floor beam 70. The mid-floor beam 70 is received in the cross-members notches 66, so cross-members 58 which do not receive and hold a mid-floor beam 70 do not have the notches 66, and these are the cross members 58 with the smooth upper supporting surface 62. Therefore, the mid-floor beam front end 80 and the mid-floor beam rear end 82 are each facing cross members 58 with smooth upper supporting surfaces 62 which do not have notches 66.

The floor-support structure also includes rear floor beams 84. The rear-floor beams 84 are similar to the mid-floor beam 70, except the rear floor beams 84 are positioned at the back of the floor support structure 50 and provide additional support to the floor support structure 50 close to the axel or the wheel portion of the tank 10. The rear floor beams 84 are essentially parallel to the side channels 52, they are received in cross member notches 56, and the rear floor beams 84 have a support surface 86 which is flush with the cross member notched upper supporting surface 64. An embodiment of the rear floor beams 84 is rectangular and tubular which the long side of the rectangle running essentially up and down, similar to the mid-floor beam 70. The rear floor beams 84 go to the rear of the floor support structure 50 but not to the rear of the tank 10. This is because the axel system is behind the floor support structure 50 and the tank rear end 76 is positioned over this axel area.

The rear floor beams 54 do not extend all the way to the mid-floor beams 70. There is at least one, and possibly a plurality of cross members 58 having smooth upper supporting surfaces 62 which do not have notches 66 between the rear floor beams 84 and the mid-floor beams 70. In other words, there are cross members 58 without notches 66 in front of the rear floor beam 84 and these same cross members 58 are also behind the mid-floor beam 70. There can also be some additional supports in front of the front panel 30 which are used to provide additional support for the tank 10 at approximately the area where the tank 10 is connected to the semi-frailer fifth wheel 41.

C. Additional Tank Features

The tank 10 also includes an axel 90 and axel support structure 92. The axel support structure 92 is positioned behind the floor support structure 50. The axel support structure 92 is connected to the floor support structure 50, and the axel support structure 92 is also connected to the side panels 16, the rear panel 32, and the floor panel 44. The axel support structure is designed to support the axel 90, so the axel support structure 92 is connected to the axel 90. The axel is typically connected to the axel support structure 92 through springs, shock absorbers and other suspension components, but the axel 90 is still considered connected to the axel support structure 92. The axel 90 typically includes two or four tires and there can be more than one axel as necessary. In one embodiment, the axel 90 supports tires on the ground, but does not support weight from fluid in the tank 10, when the tank 10 is in use for fluids. The tank 10 is usually disconnected from any truck and on the ground when in use for fluids.

The tank also typically includes a stairwell 94 for access to the roof, as best seen in FIGS. 1, 2 and 3. The path of the stairwell 94 can be defined by the panels 14, so the panels 14 can include slopes and indents for the stairwell 94. In the embodiment shown, the path for the stairwell 94 is defined in the front panel 30, one side panel 16 and the roof panel 34. The stairwell 94 can also be positioned in other locations as desired, such as entirely in front of the tank 10 or at the rear of the tank 10. Preferably the stairwell 94 includes side rails 96 and it is sloped or angled such that these side rails 96 still comply with the DOT requirements for load height and width when the tank 10 is on a truck 45.

The stairwell 94 provides access to the roof panel 34, but there are other methods for providing access to the top of the roof panel 34. For example, there could be rungs attached to any of the four sides of the tank 10 to form a ladder, and these rungs can be included either with or without a ladder cage. There can also be a separate stair which is brought into connection with the tank 10 after the tank 10 is positioned, or there can be a collapsible stairwell 94 which is assembled and brought into proper position after the tank 10 is dropped off at the intended use site.

The tank 10 will also typically provide various methods for access to the tank interior 12. Typically, this access is through pipes and man ways. Pipes 98 penetrate a panel 14 and extend into the tank interior 12. These pipes 98 have an interior terminal end 100 and an exterior terminal end 102, and typically a valve 104 would be positioned on the pipe exterior terminal end 102. There can be nozzles or open ends on the pipe interior terminal end 100, and these nozzles can include cleaning or spraying nozzles or any of a variety of structures. Manways 106 also penetrate a panel 14 to provide access to the tank interior 12. Manways 106 can be large enough to allow a person to pass through the manway 106 or they can be smaller and designed merely for inspection purposes, sampling, or other access needs. Often the manways 106 are used for cleaning and maintenance, and the manways 106 and pipes 98 can be positioned to penetrate essentially any of the panels 14 used, including the side panels 16, the front or rear panels 30, 32 or the roof panel 34. It is even possible to provide a man way 106 or a pipe 98 which penetrates the floor panel 44, but this is not normally done.

Figure 10:
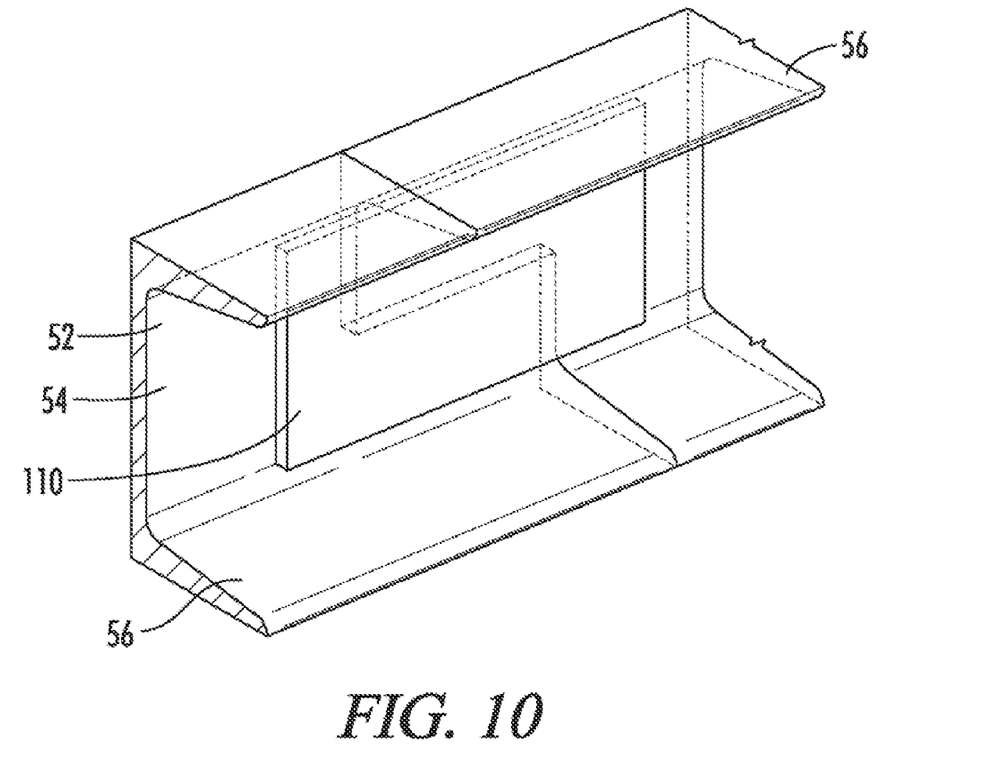
FIG. 10 is a sectional perspective view the side channel with an attached backing plate.

Referring now to FIGS. 9A, 9B and 10, side channels 52 may not be easily commercially available in lengths long enough to span the entire length of the tank. In such a case, it may be cost effective to connect two side channels 52 together to provide the necessary floor support structure 50. When this is done, a backing plate 110 is attached at the junction between the two portions of side channel 52. The backing plate 110 can be attached to the side channel 52 by welding, or with bolts, or with other connection techniques. This backing plate 110 provides greater strength within the side channel 52, and it is possible to provide a backing plate 110 at desired locations to a single piece side channel 52. This backing plate 110 can provide additional strength to help support the weight of the portable tank 10 even if the side channel 52 does not have a joint from two separate pieces coming together.

Figure 11:
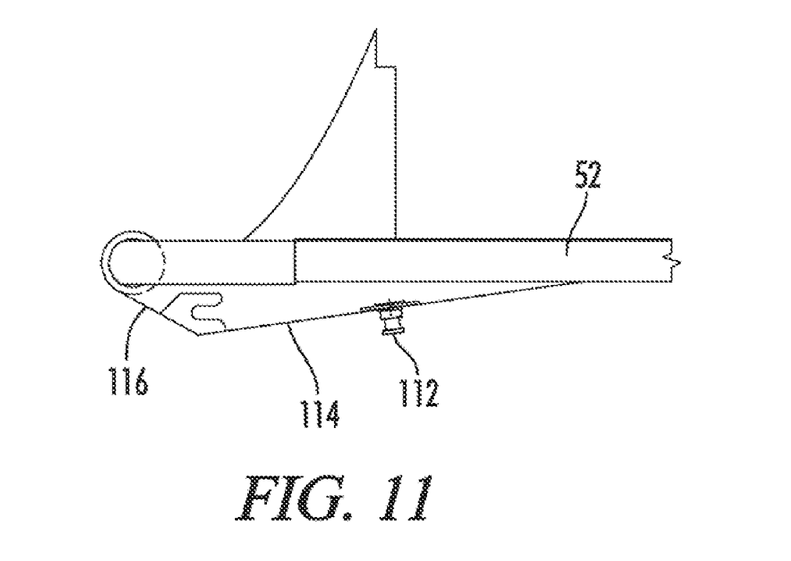
FIG. 11 is a partial side view of the truck attachment mechanism on the tank.

The portable tank 10 also includes components used to connect the tank 10 to the fifth wheel 41 of a semi-tractor 43, as best seen in FIGS. 3 and 11. This typically includes a king pin 112 which is connected to a fifth wheel plate 114. The fifth wheel plate 114 is angled such that the fifth wheel plate 114 is essentially level on the semi-tractor fifth wheel 41 when in transit. There is also typically a sloped plate 116 in front of the fifth wheel plate 114 to aid in hooking up the portable tank 10 to the semi-tractor 43. There are also supporting plates or gussets which can be used to provide additional support, particularly around the king pin 12. The supporting plates or gussets provide addition strength for towing and for connecting and disconnecting the tank 10.

It is also possible to include jacks or other lifting devices for lifting up the tank front end 40 when it is time to connect the tank 10 to a semi-tractor 43, and there are also typically electrical connections for hooking up the various required trailer lights on the tank 10 with the semi-tractor 43. The portable tank 10 can also include storage areas for various tools such as chains, shovels, and any other tools which are typically used in the trade.

Example Dimensions

The portable tank 10 is designed to be large in volume so fewer tanks 10 are needed at the work site. Listed below are example dimensions, but these dimensions are listed for example purposes only, and are not intended to limit the scope of the claimed patent, with reference being made to FIGS. 1 through 9A and 9B. Some typical dimensions for the tank 10 include a length of at least 590 inches long. The current invention has a volume of 600 barrels, or at least 580 barrels, and a height of 150 inches at the roof panel horizontal section 36.

The stairwell 94 starts with a landing in front of the tank 10, and raises to a height of 75 inches. The first step in the stairwell 94 begins 20 inches behind the front panel 30. The floor support section 50, from the front bumper to the vertical floor panel section 46 at the start of the axel support structure 92, is 576 inches. The side channel 52 is 12 inches tall in the middle, and the ends range from 6 to 10 inches tall. The cross members 58 attached to the widest part of the side channels 52 are 14⅜ inches tall at the edges of the upper surface 60, and 12½ inches tail at the central dip of the "V".

The roof panel sloped section 38 is 230 9/16 inches long, and the roof panel horizontal section 36 is 360 inches long. The mid floor beams are 2 by 4 inches, and made of ¼ inch steel. All the panels 14 are made of ¾ inch plate steel, and the support channels 26 are 2¾ inch by 6 inch channels, which are made of 3/16 inch steel. The backing plate 110 is 9½ inches by 36 inches, and made of ⅜ inch steel, and all steel is grade A36 carbon steel. Exterior surfaces are coated with a primer and an exterior grade paint, and interior surfaces are coated with a 100% solids epoxy.

While the invention has been described with respect to a limited number of embodiments, those skilled in the art, having the benefit of this disclosure, will appreciate that other embodiments can be devised which do not depart from the scope of the invention as disclosed here. Accordingly, the scope of the invention should be limited only by the attached claims.

We claim:

1. A portable tank comprising:
  (a) a plurality of panels defining a tank interior, where the panels include;
    (i) essentially parallel side panels, wherein each side panel includes a top edge, a front edge, and a rear edge;
    (ii) a roof panel connected to the side panel top edges;
    (iii) a front panel connected to the side panel front edges and to the roof panel;
    (iv) a rear panel connected to the side panel rear edges and the roof panel;
    (v) a floor panel connected to the side panels, the rear panel, and the front panel;
  (b) a floor support structure, wherein the floor support structure includes;
    (i) side channels connected to the side panels;
    (ii) a plurality of cross members connected to the side channels, wherein the cross members have V shaped upper support surfaces including at least one cross member with a smooth upper support surfaces, and at least one cross member with a notched upper support surfaces defining notches, wherein the smooth upper support surface is different than the notched upper support surface, and wherein the cross members are positioned below the floor panel;
    (iii) a plurality of mid floor beams received in the notches, where the mid floor beams are tubular, the mid floor beams are essentially perpendicular to the cross members, the mid floor beams have a mid floor beam support surface flush with the cross member upper support surfaces, and wherein the mid floor beams are between cross members with smooth upper support surfaces;
    (iv) a plurality of rear floor beams received in the cross member notches, wherein the rear floor beams are tubular;
  (c) an axle support structure connected to the floor support structure;
  (d) an axle connected to the axle support structure;
  (e) a stairway connected to the floor support structure;
  (f) support channels connected to the side wall;
  (g) at least one pipe penetrating at least one panel, wherein the pipe has an outside terminal end outside of the tank;
  (h) a valve connected to the pipe outside terminal end;
  (i) at least one manhole penetrating at least one panel;
  (j) a fifth wheel plate connected to the floor support structure;
  (k) a kingpin connected to the fifth wheel plate; and
  (l) a backing plate connected to the side channel.

2. A portable tank comprising:
  (a) a plurality of panels defining a tank interior, where the panels include;

(i) at least two side panels, wherein each side panel includes a top edge, a front edge, and a rear edge;
(ii) a roof panel connected to the side panel top edges;
(iii) a front panel connected to the side panel front edges and to the roof panel;
(iv) a rear panel connected to the side panel rear edges and the roof panel;
(v) a floor panel connected to the side panels, the rear panel, and the front panel;
(b) a floor support structure, wherein the floor support structure includes;
(i) side channels connected to the side panels;
(ii) a plurality of cross members connected to the side channels, wherein the cross members have upper support surfaces, wherein some of the cross members have smooth sided upper support surfaces and other cross members have upper support surfaces defining notches, and wherein the cross members are positioned below the floor panel; and
(iii) a mid floor beam received in the cross member notches, wherein the mid floor beam is between cross members having smooth sided upper support surfaces.

3. The portable tank of claim 2 wherein the floor support structure further comprises a rear floor beam received in the cross member notches.

4. The portable tank of claim 3 further comprising channel supports connected to the side panels and to the floor support structure, and wherein the mid floor beam is tubular and the rear floor beam is tubular.

5. The portable tank of claim 2 further comprising backing plates attached to the side channels.

6. The portable tank of claim 2 wherein the cross members are unitary.

7. The portable tank of claim 2 further comprising a staircase connected to the floor support structure, wherein the staircase is positioned to provide access to the roof panel.

8. The portable tank of claim 2 further comprising:
a kingpin; and
a fifth wheel plate wherein the kingpin is connected to the fifth wheel plate, and the fifth wheel plate is connected to the floor support structure.

9. The portable tank of claim 2 wherein the tank interior has a volume of at least 580 barrels.

10. The portable tank of claim 2 wherein the floor support structure has a length with a mid point, and the mid floor beam spans the floor support structure mid point.

11. A portable tank comprising:
(a) a plurality of connected panels defining a tank interior, where the plurality of panels includes a floor panel;
(b) a floor support structure connected to the floor panel, the floor support structure comprising;
(i) two exterior side channels;
(ii) a plurality of cross members, wherein each cross member is connected to both side channels, the cross members including an upper supporting surface, wherein some cross members include smooth upper supporting surfaces, and other cross members include upper supporting surfaces defining notches;
(iii) a tubular mid floor beam having a support surface, where the mid floor beam is received in the notches such that the mid floor beam support surface is flush with the cross member upper supporting surface;
(c) an axel support structure connected to at least one panel; and
(d) an axel connected to the axel support structure.

12. The portable tank of claim 11 further comprising a tubular rear floor beam received in the notches.

13. The portable tank of claim 12 wherein the rear floor beams are behind at least one cross member with a smooth upper supporting surface.

14. The portable tank of claim 11 wherein the floor support structure has a mid point, and the mid floor beam spans the floor support structure mid point.

15. The portable tank of claim 11 wherein the tank interior has a volume of at least 600 barrels.

16. The portable tank of claim 11 wherein the panels further comprise a roof panel having a sloped section forward of a horizontal section.

17. The portable tank of claim 16 further comprising means for access to the roof panel.

18. The portable tank of claim 11 wherein the panels further comprise side panels, the portable tank further comprising essentially vertical support channels connected to the side panels and to the side channels.

19. The portable tank of claim 11 further comprising a pipe penetrating a panel and a valve, wherein the pipe includes an outside terminal end outside of the tank interior and the valve is connected to the pipe outside terminal end.

20. The portable tank of claim 11 further comprising a manhole penetrating at least one panel so access to the tank interior is provided.

21. The portable tank of claim 11 further comprising backing plates connected to the side channels.

* * * * *